(12) United States Patent
Nozaki et al.

(10) Patent No.: US 7,770,678 B2
(45) Date of Patent: Aug. 10, 2010

(54) HYBRID VEHICLE DRIVE CONTROL SYSTEM

(75) Inventors: Yuji Nozaki, Kawasaki (JP); Kiminori Nakamura, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 855 days.

(21) Appl. No.: 11/594,246

(22) Filed: Nov. 8, 2006

(65) Prior Publication Data
US 2007/0102211 A1 May 10, 2007

(30) Foreign Application Priority Data
Nov. 9, 2005 (JP) ............................. 2005-324295

(51) Int. Cl.
*B60K 6/36* (2007.10)

(52) U.S. Cl. ................. 180/65.6; 180/65.265; 903/912; 701/22; 477/5

(58) Field of Classification Search ............... 180/65.6, 180/65.21, 65.265, 65.28, 65.285; 903/930, 903/912, 914; 477/5, 6; 701/22
See application file for complete search history.

(56) References Cited

U.S. PATENT DOCUMENTS

| 5,982,045 | A | * | 11/1999 | Tabata et al. ................... 290/17 |
| 6,018,198 | A | * | 1/2000 | Tsuzuki et al. ................. 290/17 |
| 7,351,182 | B2 | * | 4/2008 | Kobayashi ....................... 477/5 |
| 7,360,616 | B2 | * | 4/2008 | Schiele .................. 180/65.265 |
| 7,370,715 | B2 | * | 5/2008 | Colvin et al. ............. 180/65.28 |
| 7,472,769 | B2 | * | 1/2009 | Yamanaka et al. ....... 180/65.25 |
| 2002/0019290 | A1 | | 2/2002 | Mesiti et al. |
| 2005/0109551 | A1 | | 5/2005 | Komiyama et al. |
| 2005/0155803 | A1 | | 7/2005 | Schiele |
| 2007/0114082 | A1 | * | 5/2007 | Nozaki et al. .............. 180/65.6 |

FOREIGN PATENT DOCUMENTS

| DE | 103 27 306 A1 | 1/2005 |
| DE | 102004002061 A1 | 8/2005 |
| EP | 1 762 417 A1 | 3/2007 |
| JP | 11-082260 A | 3/1999 |
| JP | 2000-255285 | 9/2000 |
| JP | 2003-004138 | 1/2003 |
| JP | 2005-221073 | 8/2005 |

* cited by examiner

*Primary Examiner*—S. Joseph Morano
*Assistant Examiner*—John D Walters
(74) *Attorney, Agent, or Firm*—Global IP Counselors, LLP

(57) ABSTRACT

A hybrid vehicle drive control system has a first clutch interposed between an engine and a motor/generator, a transmission including several gear position clutches arranged between the motor/generator and a drive wheel, and a controller. The controller selectively starts the engine using torque from the first clutch during a mode drive change from an electric drive mode to a hybrid drive mode. When an engine start command occurs during the drive mode change, the controller selects the engaged gear position clutch that has the maximum torque transfer capacity from the engaged clutches constituting a vehicle running gear occurring during an engine starting process as a second clutch to be controlled. Then the controller executes a slip control of the second clutch when the first clutch is being connected to start the engine during the mode change from the electric drive mode to the hybrid drive mode.

12 Claims, 8 Drawing Sheets

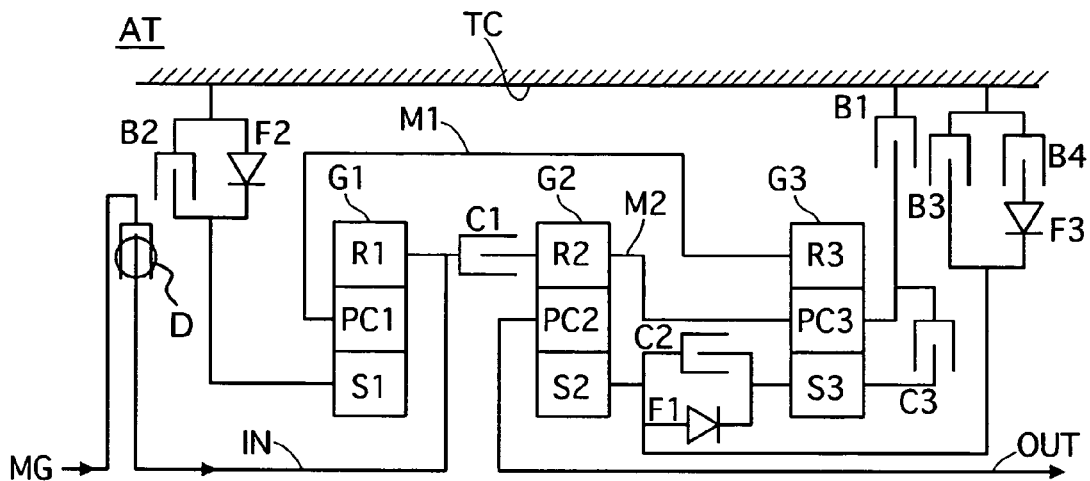

Fig. 7

|  | C1 | C2 | C3 | B1 | B2 | B3 | B4 | F1 | F2 | F3 |
|---|---|---|---|---|---|---|---|---|---|---|
| 1st |  | (O)* |  |  | ● | (O) | O |  | △ | △ |
| 2nd |  |  | O |  | (O) | (O) | O |  | △ | △ |
| 3rd |  | O | O |  | (O) |  | ● | C | △ |  |
| 4th | O | O | O |  |  |  | ● | C |  |  |
| 5th | O | O |  |  |  | O | ● | C | C |  |
| Rev |  | O |  | O | O |  |  |  | △ | △ |

△ : PARTICIPATES IN TORQUE TRANSMISSION IN POWER-ON MODE
C : CONTRIBUTES TO TORQUE TRANSMISSION DURING COASTING
● : HYDRAULIC PRESSURE FED TO FRICTION ELEMENTS, BUT OUTPUT IS NOT AFFECTED THEREBY
(O) : ENGAGES IN OVERRUN MODE
(O)* : ENGAGES DURING SELECTION, RELEASED AFTERWARD WHEN OVERRUN MODE NOT IN EFFECT
O : ENGAGES

Fig. 8

EFFECT OF SHOCK REDUCTION DURING ENGINE STARTING

| EXAMPLE: ENGINE STARTING WITH DOWNSHIFT (4→3) |
|---|
| INPUT TORQUE DURING THE INITIAL COMBUSTION OF THE ENGINE: 350 Nm |

DURING NORMAL DOWNSHIFTING

| CLUTCH | HYDRAULIC PRESSURE (MPa) | TORQUE CAPACITY (Nm) |
|---|---|---|
| I/C | 0.22 | 48.4 |
| D/C | 0.25 | 74.6 |
| HL&R/C | 0.18 | 15.7 |

WHEN CLUTCH CONTROL IS PERFORMED

| CLUTCH | HYDRAULIC PRESSURE (MPa) | TORQUE CAPACITY (Nm) | TORQUE CUT (%) |
|---|---|---|---|
| I/C | 0.22 | 48.4 | |
| D/C | 0.175 | 35.2 | 89.9 |
| HL&R/C | 0.18 | 15.7 | |

Fig. 10

HYBRID VEHICLE DRIVE CONTROL SYSTEM

CROSS-REFERENCE TO RELATED APPLICATIONS

This application claims priority under 35 U.S.C. §119 to Japanese Patent Application No. 2005-324295 filed on Nov. 9, 2005. The entire disclosure of Japanese Patent Application No. 2005-324295 is hereby incorporated herein by reference.

BACKGROUND OF THE INVENTION

1. Field of the Invention

The present invention relates to a hybrid vehicle drive control system of a hybrid vehicle having an electric drive (EV) mode a hybrid drive (HEV) mode. More particularly, the present invention relates to a hybrid vehicle drive control system for starting an engine of a hybrid vehicle having a first clutch is interposed between the engine and a motor/generator, and a second clutch is interposed between the motor/generator and a drive wheel, with one of a plurality of clutches disposed within a transmission being used as the second clutch.

2. Background Information

Various configurations have been proposed for hybrid vehicle drive systems used in such hybrid vehicles. In hybrid vehicle, an engine and a motor/generator are used to provide a driving force to one or more drive wheels. A hybrid vehicle equipped with a hybrid vehicle drive control system can be put into an electric drive (EV) mode in which the vehicle travels solely by means of power from the motor/generator. Such a hybrid vehicle can also be put into a hybrid drive (HEV) mode in which the vehicle travels using power from both the engine and the motor/generator. In the electric drive (EV) mode, the engine is stopped when it is not needed and then started when it is determined to be needed, according to prescribed vehicle operating conditions. Typically, with most vehicles, the engine is idle when the vehicle is stationary. When the engine is engaged to transmit power, a control is performed for varying the capacity of the torque converter, with the clutches in the transmission being in completely engaged conditions. One example of such a drive control system is disclosed in Japanese Laid-Open Patent Publication No. 2003-004138.

In view of the above, it will be apparent to those skilled in the art from this disclosure that there exists a need for an improved hybrid vehicle drive control system. This invention addresses this need in the art as well as other needs, which will become apparent to those skilled in the art from this disclosure.

SUMMARY OF THE INVENTION

However, with hybrid vehicles, in which an engine and a motor/generator are used as power sources for driving the vehicle, the engine will occasionally be started when the vehicle is moving. When the engine is being started, the clutch in the transmission is in a completely engaged state. Therefore, the variations in the engine output torque generated in the period between cranking and the initial combustion is transmitted directly to the transmission output axle, which often generates a shock. In such instances, the passengers and the driver in particular will be subjected to an unpleasant sensation because of this shock, which unexpectedly occurs while the vehicle is moving.

The present invention was conceived in view of the above-mentioned problem. One object of the present invention is to provide a hybrid vehicle drive control system for a hybrid vehicle in which a lack of torque transfer capacity can be prevented from occurring whether the engine of an electric vehicle has been started or is being started while in electric automobile running mode, the possibility of the engine stalling or juddering is eliminated, and the incidence of engine starting shock can be prevented.

In order to achieve the aforementioned object and other objects, a hybrid vehicle drive control system in accordance with the present invention is basically provided with an engine, a motor/generator, a first clutch, a transmission and a controller. The first clutch is arranged to between the engine and the motor/generator. The transmission includes a plurality of gear position clutches arranged between the motor/generator and at least one drive wheel of a hybrid vehicle, with the gear position clutches being selectively engaged to obtain one of a plurality of vehicle running gears. The controller is configured to selectively start the engine by using torque transmitted from the first clutch during a mode change from an electric drive mode in which the first clutch is released to a hybrid drive mode in which the first clutch is engaged when an engine start command is issued while the hybrid vehicle is running in the electric drive mode with the motor/generator being used as a power source for driving the drive wheel of the hybrid vehicle. The controller is further configured to select a second clutch that is detected as having a maximum torque transfer capacity from among the gear position clutches that are engaged to constitute one of the vehicle running gears occurring during an engine starting process, and to execute a slip control of the second clutch when the first clutch is being connected to start the engine during the mode change from the electric drive mode to the hybrid drive mode.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 is a schematic skeleton diagram illustrating the power train of the automatic transmission used in the hybrid vehicle drive control system in accordance with the illustrated embodiment of the present invention;

FIG. 8 is a clutch and brake engagement operating chart for the automatic transmission in the hybrid vehicle drive control system in accordance with the illustrated embodiment of the present invention;

FIG. 10 is a diagram showing the results of an experiment for confirming the effect of reducing shock during engine starting in accordance with the illustrated embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
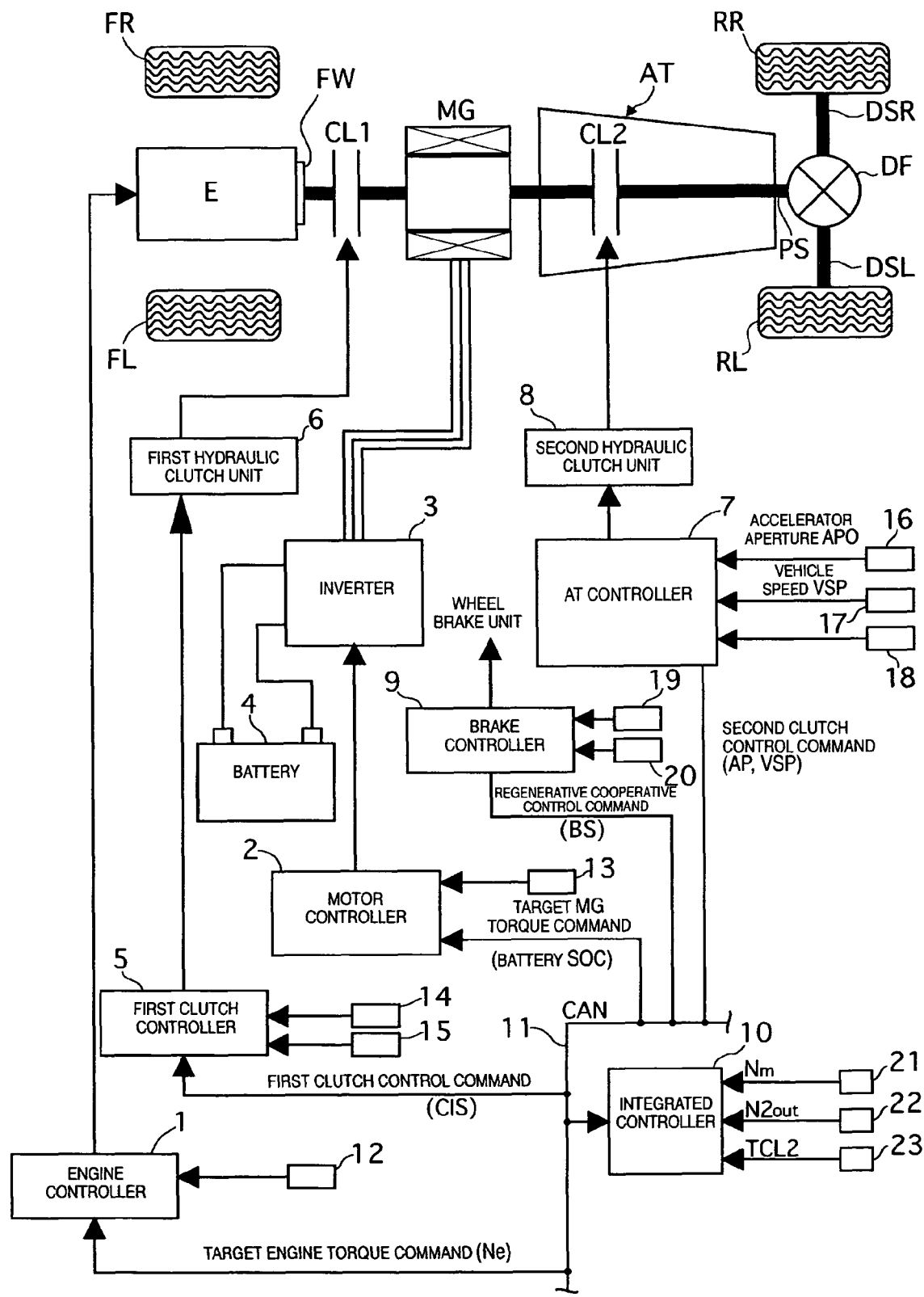
FIG. 1 is a schematic view of a power train of a hybrid vehicle with a hybrid vehicle drive control system in accordance with one embodiment of the present invention.

Referring initially to FIG. 1, a power train of a rear-wheel drive hybrid vehicle is schematically illustrated with a hybrid vehicle drive control system in accordance with a first embodiment of the present invention. As shown in FIG. 1, the hybrid vehicle drive control system of the first embodiment basically includes an internal combustion engine E, a flywheel FW, a first clutch CL1, a motor/generator MG, a second clutch CL2, an automatic transmission AT (gearbox), a propeller shaft PS, a differential gear unit DF, a left drive shaft DSL, a right drive shaft DSR, a left rear wheel RL (drive wheel), and a right rear wheel RR (drive wheel). In addition, the hybrid vehicle a front left wheel FL and a front right wheel FR.

The engine E is a gasoline or diesel engine in which various parameters are controlled by control commands from an engine controller 1, which is described later. For example, the engine controller 1 controls a throttle valve opening of a throttle valve. The flywheel FW is provided to an engine output shaft in a conventional manner.

The clutch CL1 is interposed between the engine E and the motor/generator MG to change a torque transfer capacity between the engine E and the motor/generator MG. In particular, a first clutch controller 5 and a first hydraulic clutch unit 6 are provided to control the engagement and release of the clutch CL1, including slip engagement and slip release. In other words, the operating state of the clutch CL1 is controlled by controlling the hydraulics generated by the first hydraulic clutch unit 6 according to a control command from the first clutch controller 5 described hereinafter.

The motor/generator MG is a synchronous motor/generator, in which a permanent magnet is embedded in a rotor and a stator coil is wound around a stator. The motor/generator MG is controlled by being selectively energized with three-phase alternating current delivered from an inverter 3 based on control commands issued from a motor controller 2 described hereinafter. The electrical power from the motor/generator MG can be selectively supplied to a battery 4 via the inverter 5. Thus, the motor/generator MG can operate as an electric motor that is rotatably driven on receiving a supply of electrical power from the battery 4 (this state is referred to as "power running" state), or, when the rotor is spinning due to an external force, can function as an electricity generator that produces a generating power on both ends of the stator coil so as to charge the battery 4 (this state is referred to as a "regeneration" state). In addition, the rotor of the motor/generator MG is connected to an input shaft of the automatic transmission AT via a damper (not shown).

The second clutch CL2 is interposed between the motor/generator MG and the left and right rear drive wheels RL and RR to change a torque transfer capacity between the motor/generator and the left and right rear drive wheels RL and RR. In particular, an AT controller 7 and a second hydraulic clutch unit 8 are provided to control the engagement and release of the clutch CL2, including slip engagement and slip release. In other words, the operating state of the clutch CL2 is controlled by controlling the hydraulics generated by the second hydraulic clutch unit 8 according to a control command from the AT controller 7 described hereinafter.

The automatic transmission AT automatically switches the gear position from among five forward gears and one reverse gear based on the vehicle speed, the accelerator position, or other parameters. The second clutch CL2 is not added as a special-purpose clutch, but is selected as the clutch with the maximum torque transfer capacity from a plurality of clutches engaged in the gear positions within the automatic transmission AT. An output shaft of the automatic transmission AT is connected to the left and right rear wheels RL, RR via the propeller shaft PS, the differential gear unit DF, the left drive shaft DSL and the right drive shaft DSR.

The first clutch CL1 and the second clutch CL2 are each configured such that the torque transfer capacity thereof can be changed in either a continuous fashion or a stepwise fashion. For example, the first clutch CL1 and the second clutch CL2 can be a multi-plate wet clutch configured such that its torque transfer capacity can be changed by controlling the flow rate of a hydraulic clutch fluid (hydraulic oil) and the pressure of the hydraulic clutch fluid (clutch connection hydraulic pressure) either continuously or in a stepwise fashion by a proportional solenoid. The hybrid drive system has two operating modes corresponding to the state of engagement or release of the first clutch CL1. In particular, the hybrid drive system includes an electric vehicle drive (EV) mode and a hybrid electric vehicle drive (HEV) mode. In the EV mode, the vehicle is driven solely by the power from the motor/generator MG, which occurs when the first clutch CL1 is in a released state. In the HEV mode, the vehicle is driven by the power from the engine E and the motor/generator MG, occurs when the first clutch CL1 is in an engaged state.

The control system for the hybrid vehicle will next be described.

As shown in FIG. 1, in accordance with a first embodiment, the control system for the hybrid vehicle further includes a brake controller 9, and an integrated controller 10 in addition to the engine controller 1, the motor controller 2, the inverter 3, the battery 4, the first clutch controller 5, the first hydraulic clutch unit 6, the AT controller 7, and the second hydraulic clutch unit 8 that were mentioned above. The engine controller 1, the motor controller 2, the first clutch controller 5, the AT controller 7, the brake controller 9, and the integrated controller 10 are connected via a CAN communication line 11, through which data can be exchanged. While multiple controllers are illustrated, it will be apparent to those skilled in the art from this disclosure that two or all of the controllers 1, 2, 5, 7, 9 and 10 can be combined into a single controller as needed and/or desired.

The engine controller 1 inputs data pertaining to the engine rotational speed (rpm's) as issued by an engine rotational speed sensor 12, and outputs to a throttle valve actuator (not shown) or the like a command for controlling the engine operating points (Ne and Te) according to a target engine torque command or the like issued by the integrated controller 10. The data for the engine rotational speed Ne is fed to the integrated controller 10 via the CAN communication line 11.

The motor controller 2 inputs the data from a resolver type sensor 13 that detects rotor rotation in the motor/generator MG, and outputs to the inverter a command that controls the motor operating points (Nm and Tm) of the motor/generator MG according to a target motor/generator torque command from the integrated controller 10. The motor controller 2 monitors a state of charge SOC (usable electric power) of the battery 4. The state of charge SOC data is used as control data for the motor/generator MG, and is fed to the integrated controller 10 via the CAN communication line 11.

The first clutch controller 5 inputs sensor data issued by a first clutch hydraulic sensor 14 and a first clutch stroke sensor 15. The first clutch controller 5 then outputs a control command to the first hydraulic clutch unit 6 for controlling the engagement and release of the first clutch CL1 according to the first clutch control command issued by the integrated controller 10. The data from a first clutch stroke CIS is fed to the integrated controller 10 via the CAN communication line 11.

The AT controller 7 inputs sensor data issued by an accelerator position sensor 16, a vehicle speed sensor 17, and a second clutch hydraulic sensor 18. The AT controller 7 then outputs a control command to the second hydraulic clutch unit 8 within an AT hydraulic controller valve for controlling the engagement and release of the second clutch CL2 according to a second clutch control command issued by the integrated controller 10. The data relating to the current values for an accelerator position (throttle opening) APO and a vehicle speed VSP is supplied to the integrated controller 10 via the CAN communication line 1.

The brake controller 9 inputs sensor data issued by a wheel speed sensor 19 for detecting the speeds of each of the four wheels, and a brake stroke sensor 20. When, for example, a brake is depressed for braking, and the regenerative braking force is inadequate in regard to the required braking force needed by the brake stroke BS, the brake controller 9 executes regenerative cooperative brake control according to a regenerative cooperative control command issued by the integrated controller 10, so that the mechanical braking force (hydraulic braking force and motor braking force) will compensate for the deficiency.

The integrated controller 10 manages the energy consumed by the entire vehicle, and serves to make the vehicle run at maximum efficiency. The controller 10 inputs data issued by a motor speed sensor 21 for detecting the motor speed Nm, a second clutch output rotation sensor 22 for detecting the number of second clutch output rotations N2 out, and a second clutch torque sensor 23 for detecting second clutch torque TCL2; as well as data obtained via the CAN communication line 11.

The integrated controller 10 controls the operations of the engine E according to a control command to the engine controller 1, the operations of the motor/generator MG according to a control command to the motor controller 2, the engagement and release of the first clutch CL1 according to a control command to the first clutch controller 5, and the engagement and release of the second clutch CL2 according to a control command to the AT controller 7.

Figure 2:
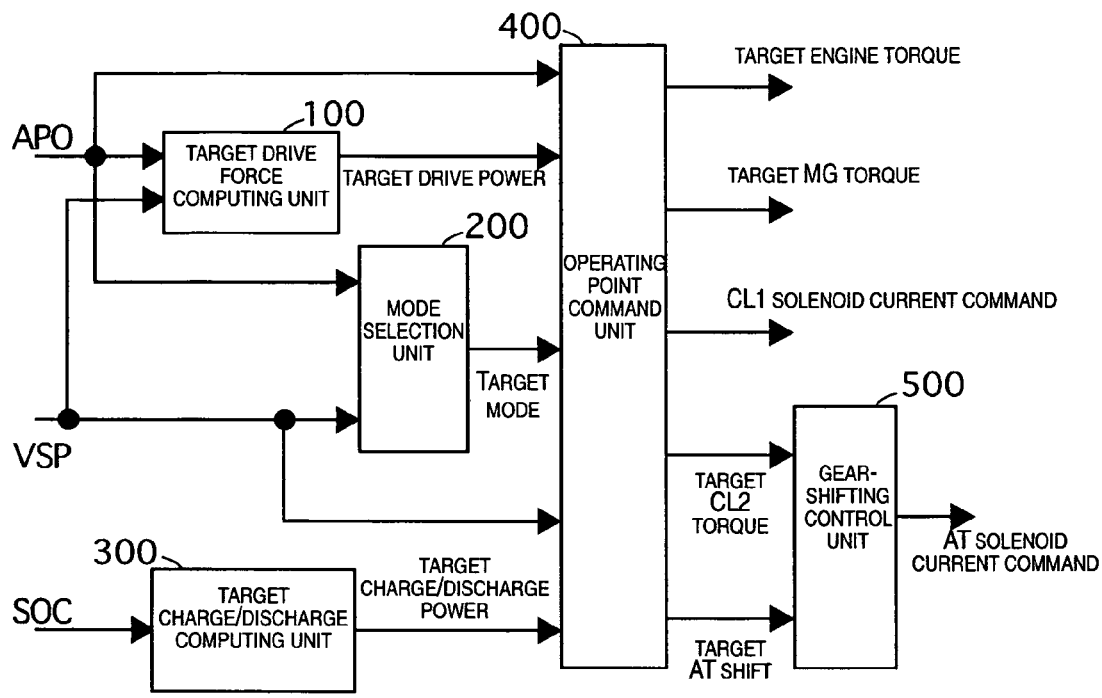
FIG. 2 is a block diagram of the integrated controller of the hybrid vehicle drive control system shown in FIG. 1 in accordance with the illustrated embodiment of the present invention.

The computation process executed by the integrated controller 10 in the first embodiment shall be described hereunder with reference to the block diagram shown in FIG. 2. For example, the computation process is carried out in 10 msec control cycle intervals by the integrated controller 10.

The integrated controller 10 has a target drive force computing unit or section 100, a mode selection unit or section 200, a target charge/discharge computing unit or section 300, an operating point command unit or section 400, and a gear-shifting control unit or section 500.

Figure 3:
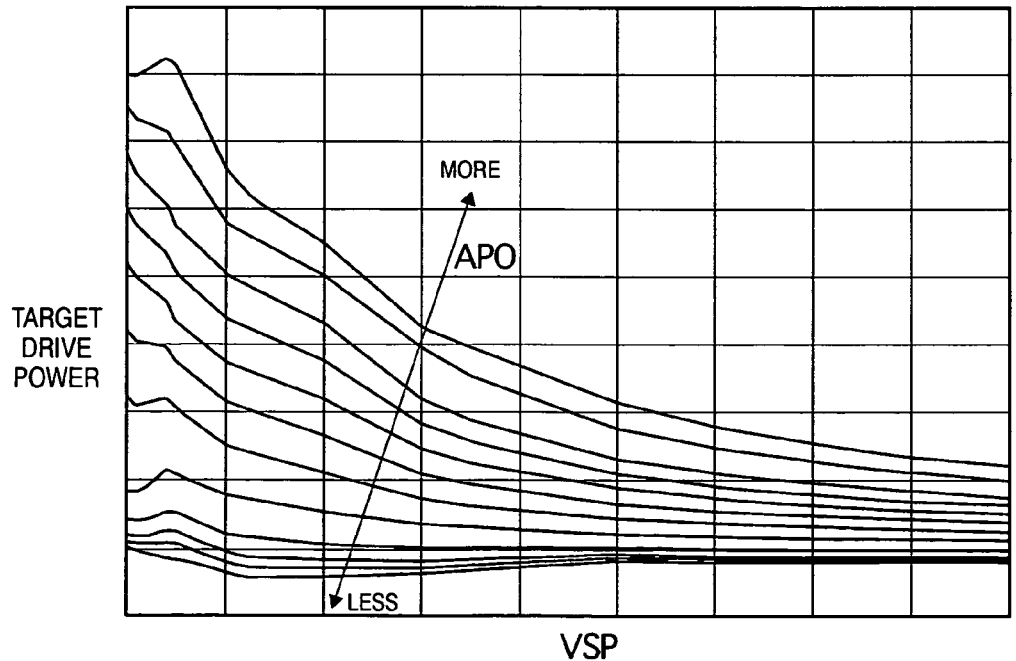
FIG. 3 is a characteristic curve diagram of a final target drive power map used by the target drive power computing unit of FIG. 2 to compute the final target drive power in accordance with the illustrated embodiment of the present invention.

The target drive force computing unit 100 computes a target drive force tFo0 based on the accelerator position APO and the vehicle speed VSP using a target drive force map, which is shown in FIG. 3.

Figure 4:
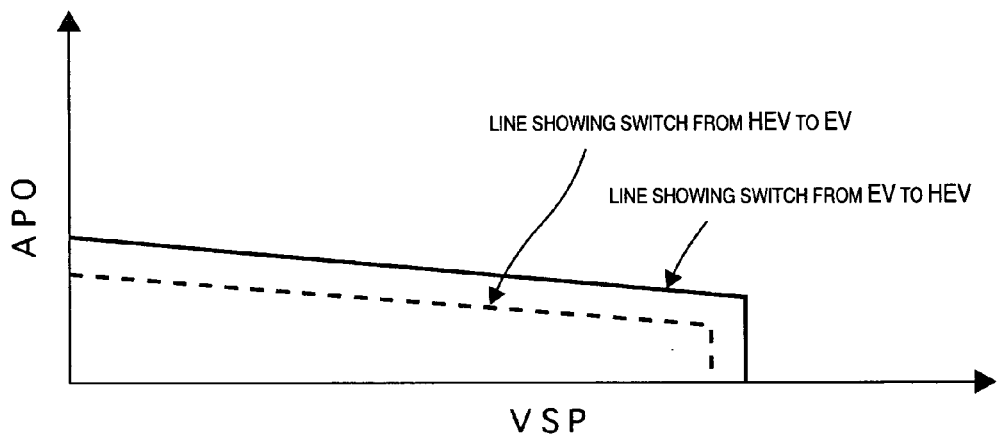
FIG. 4 is a plot illustrating an example of a target mode map used by the mode selecting unit of FIG. 2 to select a target mode (i.e., the electric drive (EV) mode region and hybrid drive (HEV) mode region of the hybrid vehicle.

The mode selection unit 200 computes a target mode based on the accelerator position APO and the vehicle speed VSP using an EV-HEV selection map, which is shown in FIG. 4. However, the HEV mode will be forcibly set as the target mode if the state of charge SOC of the battery 4 is at or below a prescribed value.

Figure 5:
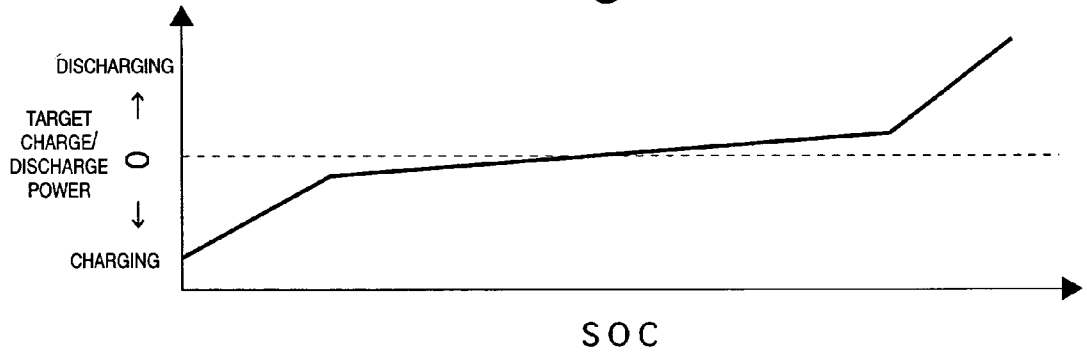
FIG. 5 is a characteristic curve diagram illustrating an example of a target charge/discharge amount map used by the target charge/discharge computing unit of FIG. 2 to compute target charge/discharge power in accordance with the illustrated embodiment of the present invention.

The target charge/discharge computing unit 300 computes a target charge/discharge power tP from the state of charge SOC of the battery 4 using a target charge/discharge quantity map, which is shown in FIG. 5.

Figure 6:
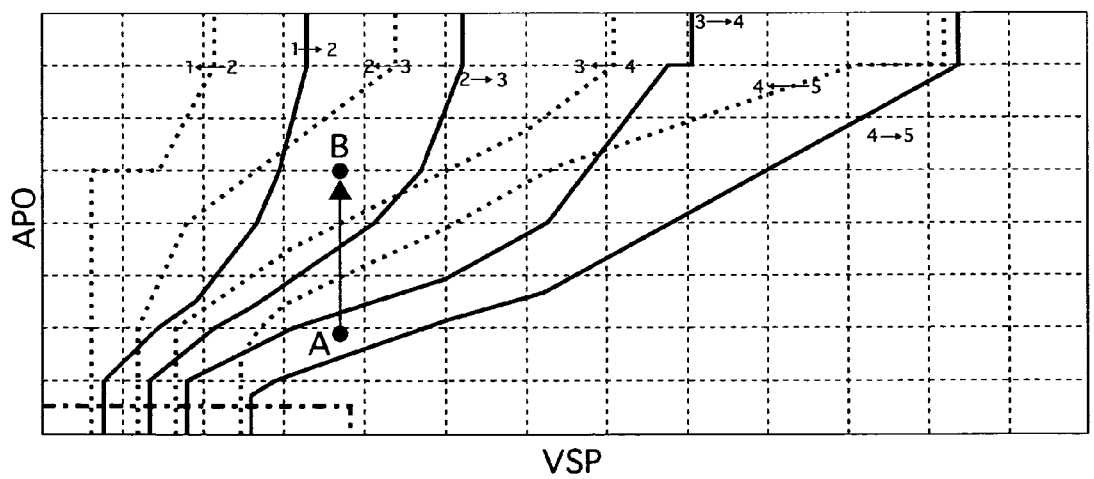
FIG. 6 is a gear change curve diagram an example of a shift map used by the operating point command section of FIG. 2 to compute target automatic shifting for the automatic transmission installed in the hybrid vehicle.

Based on the accelerator position APO, the target drive force tFo0, the target mode, the vehicle speed VSP and the target charge/discharge power tP, the operating point command unit 400 computes as targets to be attained for these operating points a transitional target engine torque, a target motor/generator torque, a target second clutch torque transfer capacity, a target automatic transmission shift, and a first clutch solenoid current command. The target automatic transmission shift is computed according to the accelerator position APO and the vehicle speed VSP using a shift map, which is shown in FIG. 6.

The gear-shifting control unit 500 controls the drive of a solenoid valve inside the automatic transmission AT according to the target second clutch torque transfer capacity and target automatic transmission shift so that these targets will be achieved.

FIG. 7 is a schematic skeleton diagram that shows a power train of the automatic transmission used in the hybrid vehicle drive system. FIG. 8 is a clutch and brake engagement operating chart based on the automatic transmission AT used in the hybrid vehicle drive system.

As shown in FIG. 7, the automatic transmission AT is provided with three simple planetary gear sets G1, G2 and G3. The front planetary gear set G1 has a front sun gear S1, a front carrier PC1, and a front ring gear R1 as rotating elements. The mid planetary gear set G2 has a mid sun gear S2, a mid carrier PC2, and a mid ring gear R2 as rotating elements. The rear planetary gear set G3, which has a rear sun gear S3, a rear carrier PC3, and a rear ring gear R3 as rotating elements. As shown in FIG. 7, the automatic transmission AT has an input shaft IN that receives a rotation drive torque from either the motor/generator MG alone, or from the engine E and the motor/generator MG together via a damper D. As shown in FIG. 7, the automatic transmission AT has an output shaft OUT is an output shaft that outputs a rotation drive torque to the left and right rear drive wheels RL and RR via the automatic transmission AT.

The automatic transmission AT has a plurality of frictional engagement elements (clutches and brakes) that can be selectively engaged and disengaged such that the power transmission path (e.g., first gear, second gear, etc.) is determined based on the combination of the engaged and disengaged frictional engagement elements. The automatic transmission AT transfers the rotation of the input shaft IN to the output shaft OUT after converting the rotation at a gear ratio corresponding to the selected gear. The rotation of the output shaft OUT is distributed to the left and right rear drive wheels RL and RR by the differential gear unit DF, the left drive shaft DSL, and the right drive shaft DSR, and thereby contributes to moving the vehicle. In particular, in the illustrated embodiment, the friction elements of the automatic transmission AT includes an input clutch C1, a high/low reverse clutch C2, a direct clutch C3, a reverse brake B1, a front brake B2, a low coast brake B3, a forward brake B4, a first one-way clutch F1, a third one-way clutch F2, and a forward one-way clutch F3. Thus, by selectively engaging and disengaging these frictional engagement elements of the automatic transmission AT, five forward gears can be obtained as well as one reverse gear. The clutches of the automatic transmission AT are generally referred to as gear position clutches that are selectively engaged and disengaged to obtain the desired gear position (e.g., $1^{st}$ gear, $2^{nd}$ gear, $3^{rd}$ gear, etc.)

The input clutch C1, on being released, connects the front ring gear R1 to the input shaft IN, and on being engaged connects the front ring gear R1 and the mid ring gear R2 to the input shaft IN. The high/low reverse clutch C2, on being engaged, connects the mid sun gear S2 and the rear sun gear S3. The direct clutch C3, on being engaged, connects the rear sun gear S3 and the rear carrier PC3.

The reverse brake B1, on being engaged, secures the rear carrier PC3 in place to a transmission case TC. The front brake B2, on being engaged, secures the front sun gear S1 in place to the transmission case TC. The low coast brake B3, on being engaged, secures the mid sun gear S2 in place to the transmission case TC. The forward brake B4, on being engaged, secures the mid sun gear S2 in place to the transmission case TC.

The first one-way clutch F1 frees rotation in the forward direction of the rear sun gear S3 with respect to the mid sun gear S2 (i.e., in the same direction of rotation as that of the engine), and locks reverse rotation. The third one-way clutch F2 frees rotation in the forward direction of the front sun gear S1 and locks reverse rotation. The forward one-way clutch F3 frees rotation in the forward direction of the mid sun gear S2 and locks reverse rotation.

The output shaft OUT is directly connected to the mid PC2. The front carrier PC1 and the rear ring gear R3 are directly connected via a first member M1. The mid ring gear R2 and the rear carrier PC3 are directly connected via a second member M2.

As shown in the engagement operating chart in FIG. 8, the automatic transmission AT reaches first gear via the engagement of the high/low reverse clutch C2, the front brake B2, the low coast brake B3, and the forward brake B4. The automatic transmission AT shifts to second gear via the engagement of the direct clutch C3, the front brake B2, the low coast brake B3, and the forward brake B4. The automatic transmission AT shifts to third gear via the engagement of the high/low reverse clutch C2, the direct clutch C3, the front brake B2, and the forward brake B4. The automatic transmission AT shifts to fourth gear via the engagement of the input clutch C1, the high/low reverse clutch C2, the direct clutch C3, and the forward brake B4. The automatic transmission AT shifts to fifth gear via the engagement of the input clutch C1, the high/low reverse clutch C2, the front brake B2, and the forward brake B4. The automatic transmission AT shifts to reverse gear via the engagement of the high/low reverse clutch C2, the reverse brake B1, and the front brake B2.

Figure 9:
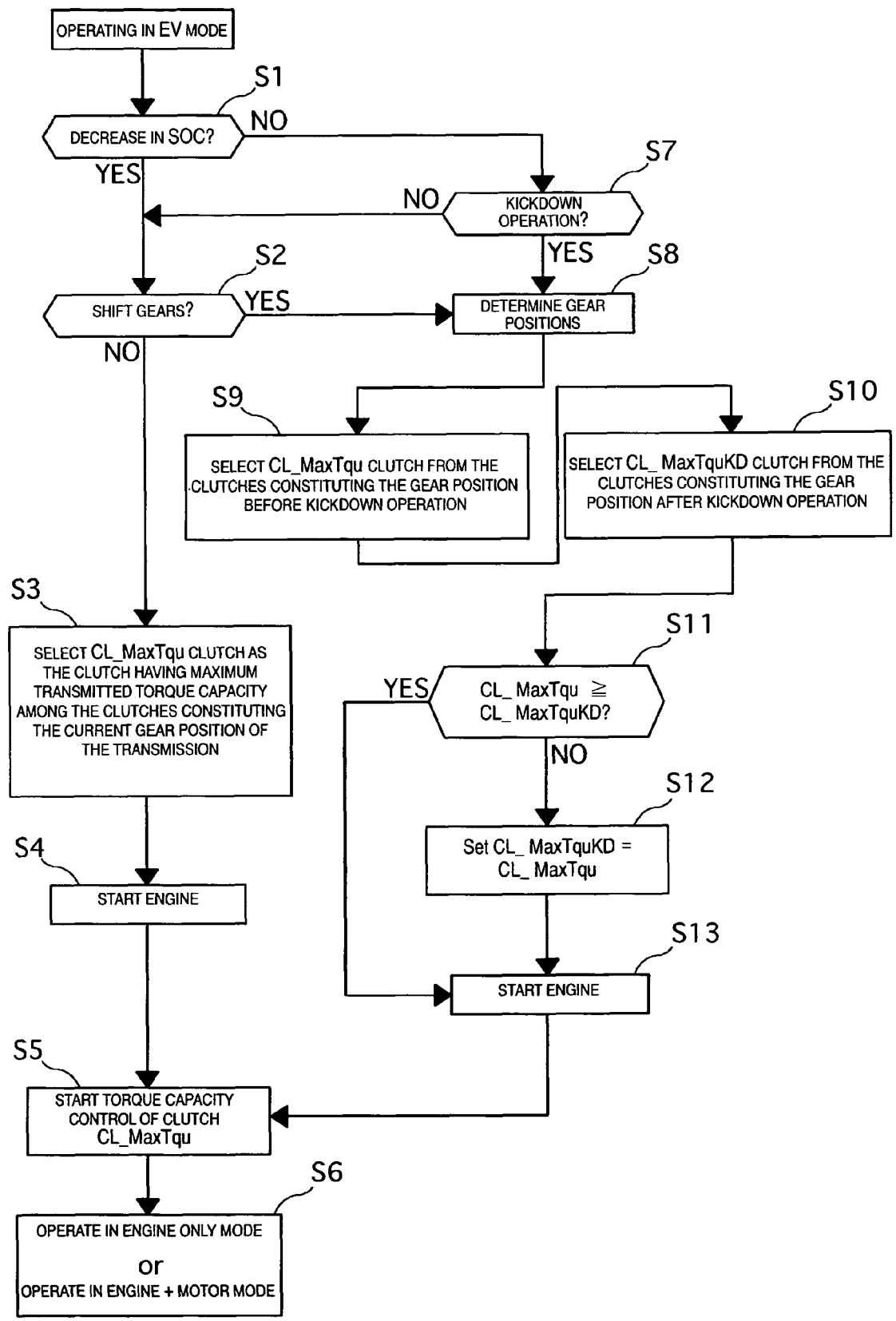
FIG. 9 is a flowchart showing a hybrid vehicle drive control program executed by the integrated controller during engine starting in accordance with the illustrated embodiment of the present invention.

FIG. 9 is a flow chart showing the flow of the engine starting control process executed by the integrated controller 10 of the first embodiment when the vehicle is running under the EV mode. The individual steps are described below (engine starting control). The process starts when an engine starting command is generated when the vehicle is running under the EV mode.

In step S1, the integrated controller 10 determines whether the state of charge SOC of the battery 4 has decreased to a prescribed level. If the answer is Yes, then the process moves to step S2, while if the answer is No, then the process moves to step S7. In other words, when the vehicle is running under the EV mode, in step S1, the integrated controller 10 determines whether the state of charge SOC of the battery 4 has reached or fallen below a prescribed value, whereupon the target mode is forcibly changed by the integrated controller 10 from the EV mode to the HEV mode.

In step S2, following a decision in step S1 that the state of charge SOC of the battery 4 had decreased to a prescribed level, the integrated controller 10 determines whether the gears of the automatic transmission AT have been shifted when the transition from the EV mode to the HEV mode has been made once the engine E has been started. If the answer is Yes, then the process moves to step S8, and if the answer is No, then the process moves to step S3.

In step S3, following a decision in step S2 that a gear shift has not been performed by the automatic transmission AT, the integrated controller 10 then determines which one of the gear position clutches has a maximum torque transfer capacity from among the gear position clutches in the automatic transmission AT that are engaged in the automatic transmission AT to constitute a gear position immediately prior to starting the engine when the vehicle is running under electric drive mode. Then, in step S3, the integrated controller 10 selects the one of the gear position clutches that has the maximum torque transfer capacity from the gear position clutches constituting the current gear position in the automatic transmission AT as the second clutch CL2. In other words, this one of the gear position clutches is then designated as a maximum torque transfer capacity clutch CL_MaxTqu, which is also designated as the second clutch CL2 in FIG. 1. For example, as seen in FIG. 8, when the gear position of the automatic transmission AT is in the fourth gear, the gear position clutches that constitute the fourth gear are the input clutch C1, the high/low reverse clutch C2 and the direct clutch C3. The integrated controller 10 then determines, for example, that the direct clutch C3 among these gear position clutches C1, C2 and C3 is the one with the maximum torque transfer capacity CL_MaxTqu whose capacity is to be controlled. Thus, in step S3, the integrated controller 10 selects the direct clutch C3 as the second clutch CL2, which has the maximum torque transfer capacity CL_MaxTqu as can be seen by referring to FIG. 10. Step S3 constitutes a maximum torque transfer capacity clutch detection section of the integrated controller 10. Next, the process moves to step S4.

In step S4, following the selection of the maximum torque transfer capacity clutch CL_MaxTqu whose capacity is to be controlled in step S3, the engine E is started, whereupon the process moves to step 5. When "starting the engine", the motor/generator MG is used as a starter motor, and the engine E, which is stopped, is started by slip engagement of the first clutch CL1 such that a drag torque of the first clutch CL1 starts the engine E.

In step S5, following starting the engine in step S4, the torque transfer capacity control of the selected maximum torque transfer capacity clutch CL_MaxTqu (the second clutch CL2) whose capacity is to be controlled is initiated, whereupon the process moves to step S6.

Figure 11:
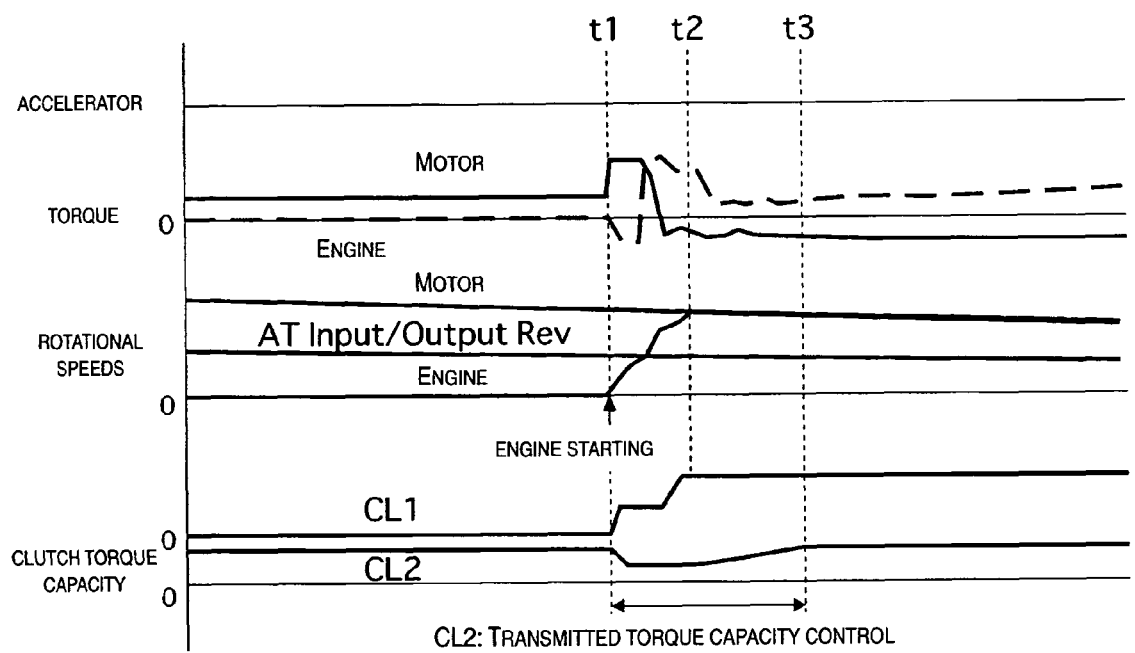
FIG. 11 is an operation time chart illustrating the operational effects on the accelerator, the torque, the number of rotations, and the clutch torque transfer capacity during engine starting caused by a decrease in the state of charge in the state of charge SOC of the battery 4 while operating in the EV mode in accordance with the illustrated embodiment of the present invention.
Figure 12:
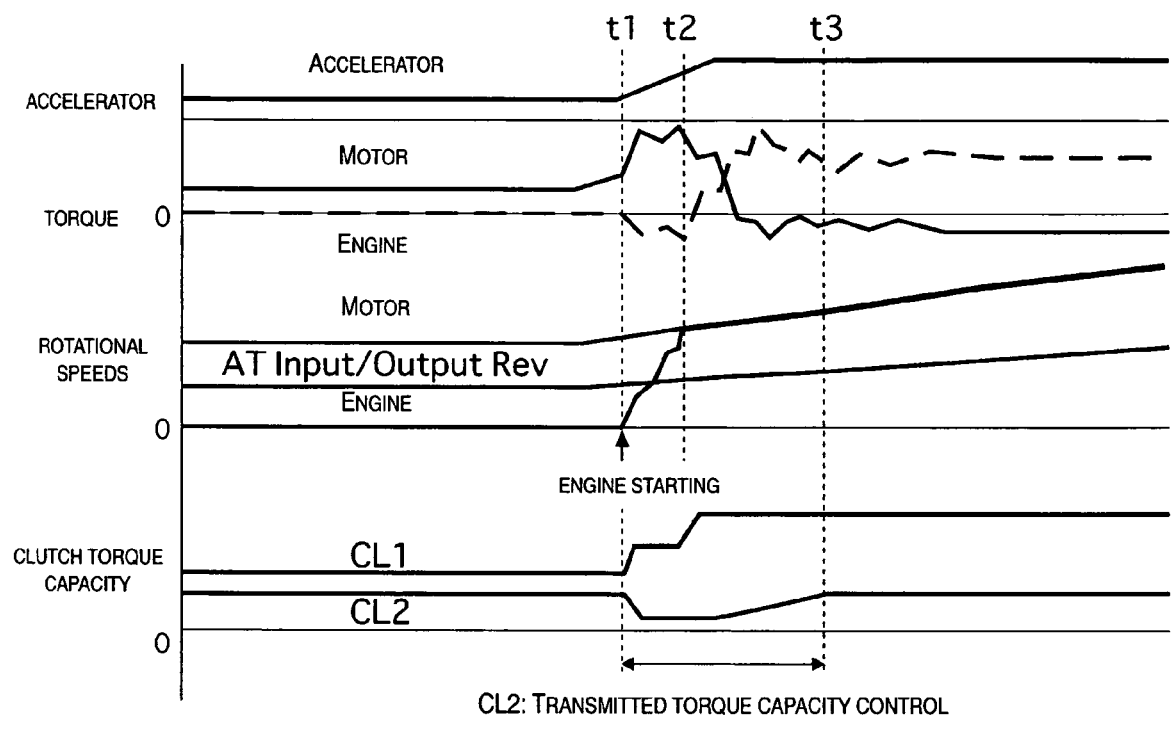
FIG. 12 is an operation time chart illustrating the operational effects on the accelerator, the torque, the number of rotations, and the clutch torque transfer capacity during engine starting caused by a kickdown situation occurring while operating in the EV mode in accordance with the illustrated embodiment of the present invention.

If a completely engaged maximum torque transfer capacity clutch CL_MaxTqu has been selected as the second clutch CL2 during engine starting, "torque transfer capacity control of the maximum torque transfer capacity clutch" reduces the torque transfer capacity of the second clutch CL2 while the engine E is started (refer to the second clutch CL2 torque transfer capacity control characteristics shown in FIGS. 11 and 12). In other words, "capacity control of the clutch CL_MaxTqu whose capacity is to be controlled" is performed by reducing the torque transfer capacity of the second clutch CL2 that is completely engaged in order to hold the gear position while the engine E is started (refer to the CL2 torque transfer capacity control characteristics shown in FIGS. 10 and 11).

In step S6, following the start of torque transfer capacity control of the maximum torque transfer capacity clutch CL_MaxTqu in step S5, i.e., engine starting has been concluded, the process then moves to the HEV mode (operation of the engine E alone or in combination with the motor/generator MG) from the point where capacity control of the maximum torque transfer capacity clutch CL_MaxTqu has concluded.

In step S7, following the decision in step S1 that the state of charge SOC of the battery 4 has not decreased below a prescribed level, the integrated controller 10 determines whether a kick-down operation has been performed by the driver (i.e., the driver has fully depressed the accelerator in response to a sudden need for extra speed, and the gear position has shifted to the low side). If the answer is Yes, then the process moves to step 8. However, if the answer is No, then the process moves to step S2 as discussed above.

In step S8, following the decision in step S7 that a kick-down operation is in effect, or the decision in step S2 that gears have been shifted, the gear position immediately before a kickdown operation (or before shifting gears) and the gear position after immediately a kickdown operation (or after shifting gears) are determined. Then, the process moves to steps S9 and S10. The phrase "gear positions are determined" as used herein means the gear positions that are determined to occur before and after kickdown operation (shifting gears). For example, in FIG. 6, when the accelerator pedal is depressed so as to move from point A (the gear position before a kickdown operation) to point B (the gear position after a kickdown operation), the gear positions are determined to be fourth gear (before a kickdown operation) and third gear operation after a kickdown operation).

In step S9, following the determining of the gear positions in step S8, the integrated controller 10 then determines which one of the gear position clutches has a maximum torque transfer capacity from among the gear position clutches in the automatic transmission AT that are engaged in the automatic transmission AT to constitute a gear position immediately prior to the kickdown operation (or before shifting gears) when the vehicle is running under electric drive mode. Then, in step S9, the integrated controller 10 selects the one of the gear position clutches that has the maximum torque transfer capacity from the gear position clutches constituting the gear position immediately prior to the kickdown operation (or before shifting gears) as the second clutch CL2. This one of the gear position clutches is then designated as a maximum torque transfer capacity clutch CL_MaxTqu, which is also designated as the second clutch CL2 in FIG. 1 before the kickdown operation (or before shifting gears). Once the maximum torque transfer capacity clutch CL_MaxTqu has been selected from the clutches constituting the gear position before the kickdown operation (or before shifting gears) in the automatic transmission AT, the process moves to step S10.

In step S110, following the selection of the maximum torque transfer capacity clutch CL_MaxTqu in step S9, the integrated controller 10 then determines which one of the gear position clutches has a maximum torque transfer capacity from among the gear position clutches in the automatic transmission AT that are engaged in the automatic transmission AT to constitute a gear position immediately after the kickdown operation (or after shifting gears) when the vehicle is running under the HEV mode. Then, in step S10, the integrated controller 10 selects the one of the gear position clutches that has the maximum torque transfer capacity from the gear position clutches constituting the gear position immediately after the kickdown operation (or after shifting gears) as the second clutch CL2. This one of the gear position clutches is then designated as a maximum torque transfer capacity clutch CL_MaxTquKD, which is also designated as the second clutch CL2 in FIG. 1 after the kickdown operation (or after shifting gears). Once the maximum torque transfer capacity clutch CL_MaxTquKD has been selected from the clutches constituting the gear position after kickdown (after the shifting gears) in the automatic transmission AT, the process moves to step S11.

In step S11, following the selection of the maximum torque transfer capacity clutch CL_MaxTqu in step S110, the integrated controller 10 compares the maximum torque transfer capacity of the clutches C_-MaxTqu and CL_MaxTquKD. In other words, the integrated controller 10 determines whether CL_MaxTqu≧CL_MaxTquKD is true. If the answer is Yes, then the maximum torque transfer capacity clutch CL_MaxTqu is subjected to capacity control and not the maximum torque transfer capacity clutch CL_MaxTquKD. If the answer is No, then the process moves to step S12.

In step S12, following the decision in step S11 that CL_MaxTqu<CL_MaxTquKD, then the maximum torque transfer capacity clutch CL_MaxTquKD is subjected to capacity control and not CL_MaxTqu, whereupon the process moves to step S13. In other words, steps S8 through S12 correspond to the maximum torque transfer capacity clutch selection section for detecting which of the clutches has the maximum torque transfer capacity from among all engaged clutches in the automatic transmission AT constituting the gear positions that are passed through before and after the engine has been started by the driver due to the kickdown operation or a gear shifting operation when the vehicle is running under the EV mode and being switched to the HEV mode.

If there are no clutches in common between the two groups of clutches constituting the gear positions that are passed through before and after the engine has been started by the driver due to a kickdown or gear shifting operation, then the maximum torque transfer capacity detection section selects the clutch with the maximum torque transfer capacity as the second clutch CL2 in the respective gear positions that are passed through before and after the engine E is started. The second clutch having the maximum torque transfer capacity is caused to be changed when the engine E starts and the gear position is shifted.

When the engine E is then started, the clutch released before the move is then selected as the second clutch CL2 after the move, in which case the capacity control with regard to the second clutch CL2, when the engine E is started, is performed by gradually increasing the torque transfer capacity while the engine E is being started, in a torque transfer capacity range within which the second clutch CL2 will be slip-engaged.

In step S13, following the selection of the maximum torque transfer capacity clutch CL_MaxTqu or CL_MaxTquKD that is to be subjected to capacity control in step S11 or S12, an engine starting operation is performed as explained below. Once the engine starting operation has began, the process moves to step S5 where torque transfer capacity control of the maximum torque transfer capacity clutch CL_MaxTqu or CL_MaxTquKD is performed.

In hybrid vehicles having an engine and a motor/generator as driving devices or power sources, the engine will be stopped if it is not required, and started at the point in time that the engine E is deemed necessary based on conditions (e.g., when the state of charge SOC of the battery 4 has decreased or the driver requires acceleration torque) determined in advance by the vehicle operating state. However, with hybrid vehicles, in which an engine and a motor/generator are used as the driving devices or power sources, the engine often started from a stopped state when the vehicle is in motion. When the engine E is started while the vehicle is in motion, the clutches constituting the gear position in the automatic transmission will be in a completely engaged state. Therefore, the variation in the engine output torque generated during the period between cranking and initial combustion will be transmitted directly to the transmission output axle, generating a so-called engine starting shock.

On the other hand, in the hybrid vehicle drive control system of the first embodiment, the maximum torque transfer capacity clutch, which has the maximum torque transfer capacity among the engaged gear position clutches in the automatic transmission AT constituting the gear position, is selected as the second clutch CL2 when the engine E is started under the EV mode, and the torque transfer capacity of the second clutch CL2 is controlled based on slip engagement. As a result, when the engine E is started while operating in the EV mode, a lack of torque transfer capacity will not occur even when the engine E is started, the possibility of engine stalling and judder will be eliminated, and the occurrence of engine starting shock will be preventable.

In other words, the torque transfer capacity of the second clutch CL2 is controlled based on a slip engagement during engine starting while operating in the EV mode. Therefore, less fluctuation in the engine output torque generated in the period between cranking and initial combustion is directly transmitted to the output shaft OUT, and any discomfort caused by engine starting shock can be minimized. Moreover, the clutch having the maximum torque transfer capacity among the engaged gear position clutches of the automatic transmission AT constituting the current gear position is selected as the second clutch CL2, thereby resulting in stable vehicle operation since a lack of torque transfer capacity will not occur even during engine starting, and eliminating any possibility of judder caused by deceleration from a loss of torque, or engine stall due to a sudden increase in engine load.

As a result, when the engine E is started while operating in the EV mode, a lack of torque transfer capacity will not occur even when the engine E is started. Also the possibility of the engine stalling and juddering will be eliminated, and the occurrence of engine starting shock will be reduced or prevented.

The results of an experiment confirming the shock-reducing effect during engine starting are shown in FIG. 10. The experiment confirming the shock-reducing effect was performed during an engine starting together with a downshift ($4^{th}$ gear→$3^{rd}$ gear), with the input torque during the initial combustion of the engine being 350 Nm. With the vehicle running under the EV mode, the clutches participating in $4^{th}$ gear were the input clutch C1, the high/low-reverse clutch C2, and the direct clutch C3, as shown in FIG. 8. The normal torque transfer capacity values of these clutches during the downshift were as follows, and are also shown in FIG. 10:

| | |
|---|---|
| Input clutch C1: | 48.4 [Nm] |
| Direct clutch C3: | 78.6 [Nm] |
| High/low-reverse clutch C2: | 15.7 [Nm] |

Accordingly, the direct clutch C3, which has the maximum torque transfer capacity of these three clutches, was selected as the second clutch CL2. When the engine E was then started, the direct clutch C3 that had been selected as the second clutch CL2 was subjected to torque transfer capacity control based on a slip engagement, and when the torque transfer capacity of the direct clutch C3 had decreased from 78.6 [Nm] to 35.2 [Nm], as shown in FIG. 10, the torque cut efficiency reached 89.9%. The results showed that only approximately 10% of the input torque during the initial combustion of the engine was transmitted to the output shaft OUT of the automatic transmission AT.

The reasons that the clutch with maximum torque transfer capacity is selected as the second clutch CL2 are that (1) the clutch-facing surfaces have high durability, and (2) it is undesirable for slipping to start before its proper timing during slip control.

During engine starting caused by a decrease in the state of charge SOC of the battery 4 while operating in the EV mode, the process flow based on the flowchart shown in FIG. 9 is step S1→step S2→step S3→step S4→step S5→step S6. In other words, in step S3, the maximum torque transfer capacity clutch CL_MaxTqu is selected from the gear position clutches constituting the current gear position in the automatic transmission AT. In step S4, the engine E is started. In step S5, the capacity control is initiated for the selected maximum torque transfer capacity clutch CL_MaxTqu. In step S6, the engine starting is concluded, and the operation shifts to the HEV mode at the point in time that capacity control of the maximum torque transfer capacity clutch CL_MaxTqu has ended.

Changes relating to the accelerator position, the torques, the rotational speeds, and the clutch torque capacities during engine starting caused by a decrease in the state of charge SOC of the battery 4 while operating in the EV mode are described according to the time chart shown in FIG. 11. Between the initiation of engine starting at time t1 and the conclusion of engine starting at time t2, the motor torque rises sharply and then decreases to negative torque, whereas the engine torque rises sharply from negative torque. The engine rotational speed gradually increases from the initiation of engine starting at time t1, until the value matches the motor speed at the conclusion of engine starting at time t2. The torque transfer capacity of the first clutch CL1 rises in the second stage due to the starting of the engine E by slip engagement of the first clutch CL1 after the initiation of engine starting at time t1, and a state of complete engagement is reached at substantially the same time as the conclusion of engine starting at time t2. On the other hand, the torque transfer capacity of the second clutch CL2 decreases only to a prescribed level, and is maintained at that reduced level so that fluctuation in the combination of motor torque and engine torque will be minimized.

From the conclusion of engine starting at time t2 to the start of the HEV mode at time t3, the motor torque fluctuates at the negative level, and the engine torque fluctuates at the positive level. The engine rotational speed remains the same as the motor speed. The torque transfer capacity of the first clutch CL1 is held at a level reflecting a state of complete engagement. On the other hand, the torque transfer capacity of the second clutch CL2 is gradually elevated at a gentle slope in accordance with the ramp characteristics and at time t3 reaches a level reflecting a state of complete engagement. In other words, the period between times t1 and t3 corresponds to the period during which the torque transfer capacity of the second clutch CL2 is controlled based on the slip engagement of the second clutch CL2.

In the hybrid vehicle drive control system of the illustrated embodiment, as has been described in the foregoing, the maximum torque transfer capacity clutch detection section (step S3) of the integrated controller 10 detects the clutch having the maximum torque transfer capacity among the engaged gear position clutches in the automatic transmission AT constituting the gear position immediately before starting the engine E when the vehicle is running under the EV mode. The engine starting control section of the integrated controller 10 selects the maximum torque transfer capacity clutch CL_MaxTqu as the second clutch CL2, and then controls the torque transfer capacity of the second clutch CL2 based on slip engagement when the engine E is started while in the EV mode in response to an engine starting command issued in conjunction with a decrease in battery SOC from the motor/generator MG.

Accordingly, when starting the engine E due to a decrease in battery SOC while in the EV mode, it is possible to reduce the shock of starting the engine E while ensuring the required clutch durability and optimal slip timing for the slip control.

In the hybrid vehicle drive control system of the illustrated embodiment, if a completely engaged clutch has been selected as the second clutch CL2 when the engine E is started, then the engine starting control section of the integrated controller 10 will reduce the torque transfer capacity of the second clutch CL2 during engine starting. Accordingly, the torque transfer capacity of the second clutch CL2 is reduced when the engine E is started due to a decrease in battery SOC while operating in the EV mode, thereby making it possible to mitigate engine starting shock that accompanies fluctuations in engine output torque.

When the engine E is started due to a kickdown situation occurring while operating in the EV mode, the process flow based on the flowchart shown in FIG. 9 is step S1→step S7→step S8→step S9→step S10→step S11 (→step S12)→S13→step S5→step S6. In other words, in step S9, the maximum torque transfer capacity clutch CL_MaxTqu is selected from the gear position clutches constituting the gear position prior to the kickdown operation. In step S10, the maximum torque transfer capacity clutch CL_MaxTquKD is selected from the gear position clutches constituting the gear position after kickdown. In steps S11 and S12, the maximum torque transfer capacity clutch CL_MaxTqu is selected from among all clutches constituting the gear positions before and after a kickdown operation. In step S13, the engine E is started. In step S5, the torque transfer capacity control is initiated for the selected maximum torque transfer capacity clutch CL_MaxTqu, which can change among the gear position clutches when a shifting operation occurs without a common engaged clutch for the gears occurring during the engine starting process. In step S6, engine starting is concluded, and the operation shifts to the HEV mode at the point in time that torque transfer capacity control for the maximum torque transfer capacity clutch CL_MaxTqu has ended.

Changes relating to the accelerator position, the torques, the rotational speeds, and the clutch torque capacities during engine starting caused by the kickdown operation while operating in the EV mode are described according to the time chart shown in FIG. 12. Between the initiation of engine starting at time t1 and the conclusion of engine starting at time t2, the motor torque rises sharply, whereas the engine torque decreases to negative torque. The engine rotational speed gradually increases from the initiation of engine starting at time t1 until the value matches the motor speed at the conclusion of engine starting at time t2. The torque transfer capacity of first clutch CL1 rises in the second stage due to the starting of the engine E by slip engagement of the second clutch CL2 after the initiation of engine starting at time T1, and a state of complete engagement is reached at substantially the same time as the conclusion of engine starting at time t2. On the other hand, the torque transfer capacity of the second clutch CL2 decreases only to a prescribed level (larger than that encountered when the starting was caused by a decrease in the SOC), and is maintained at that reduced level so that fluctuation in the combination of motor torque and engine torque will be minimized.

From the conclusion of engine starting at time t2 to the start of the HEV mode at time t3, the motor torque fluctuates after dropping from positive torque to negative torque, while the engine torque fluctuates after rising from negative torque to positive torque. The engine rotational speed remains the same as the motor speed. The torque transfer capacity of the first clutch CL1 is held at a level reflecting a state of complete engagement. On the other hand, the torque transfer capacity of the second clutch CL2 is held at the reduced level up until near the point in time that the accelerator depressing operation has ended, is then gradually elevated at a gentle slope in accordance with the ramp characteristics, and, at time t3, reaches a level reflecting a state of complete engagement. In other words, the period between times t1 and t3 corresponds to the period during which the second clutch CL2 is subjected to torque transfer capacity control based on slip engagement.

In the hybrid vehicle drive control system of the illustrated embodiment, as described above, the maximum torque transfer capacity clutch detection section (steps S8 through S12) of the integrated controller 10 detect the gear position clutch having the maximum torque transfer capacity from among all engaged clutches in the automatic transmission AT constituting the gear positions that are passed through before and after the engine has been started by the driver due to the kickdown operation. When the engine E is started while operating in the EV mode in response to an engine start command issued in conjunction with a kickdown operation performed by the driver, the engine starting control section of the integrated controller 10 selects the maximum torque transfer capacity clutch as the second clutch CL2, and then controls the torque transfer capacity of the second clutch CL2 based on slip engagement.

Accordingly, when the engine E is started due to a kickdown operation while operating in the EV mode, it is possible to mitigate engine starting shock while ensuring clutch durability and optimal slip timing for the slip control.

In the hybrid vehicle drive control system of the illustrated embodiment, when there are no gear position clutches in common between the two groups of engaged clutches constituting the gear positions that are passed through immediately before and immediately after the engine E has been started by the driver due to a kickdown operation, the integrated controller 10 selects the clutch having the maximum torque transfer capacity as the second clutch CL2 in the respective gear positions that are passed through immediately before and immediately after the engine E is started as determined in step S8 by the maximum torque transfer capacity detection section. Thus, in step S5, the integrated controller 10 will cause the second clutch CL2 having the maximum torque transfer capacity clutch to change when the engine E starts and the gear position is shifted. Accordingly, a clutch whose capacity is controlled before and after a kickdown-induced operation of shifting is caused to change in agreement with the engine starting timing, whereby smooth torque flow can be achieved even if the gear position has shifted.

In the hybrid vehicle drive control system of the first embodiment, if the engine starting control section of the integrated controller 10 has selected a completely engaged clutch as the second clutch CL2 during engine starting, the torque transfer capacity of the second clutch CL2 will be reduced during engine starting. Accordingly, engine starting shock accompanying fluctuations in engine output torque can be mitigated by reducing the torque transfer capacity of the second clutch CL2 during engine starting caused by kickdown under the EV mode.

The effect of the invention shall be described hereunder. Preferably, the hybrid vehicle drive control system for a hybrid vehicle of the illustrated embodiment allows the following effects to be obtained.

When the hybrid vehicle drive control system is configured according to the present invention, as described above, a lack of torque capacity will not occur even when the engine E is started under the EV mode, a possibility of engine stalling and juddering will be reduced or eliminated, and an occurrence of engine starting shock will be reduced or prevent.

When the hybrid vehicle drive control system is configured such that the maximum torque transfer capacity clutch detecting section (step S3) detects the clutch having the maximum torque transfer capacity from among all engaged gear position clutches in the automatic transmission AT that constitute the gear position immediately prior to engine starting while the vehicle is running under the EV mode, then the integrated controller 10 selects the maximum torque transfer capacity clutch CL_MaxTqu as the second clutch CL2, and controls the torque transfer capacity of the second clutch CL2 based on slip engagement when the engine E is started during EV mode in response to an engine starting command issued in conjunction with a decrease in battery SOC from the motor/generator MG. Accordingly, when the engine E is started due to a decrease in battery SOC under the EV mode, it is possible to mitigate engine starting shock while ensuring clutch durability and optimal slip timing for the slip control.

When the hybrid vehicle drive control system is configured such that the maximum torque transfer capacity clutch detecting section (steps S8 through S12) detects the clutch with the maximum torque transfer capacity from among all engaged clutches in the automatic transmission AT that constitute the gear positions that are passed through before and after the engine has been started by the driver due to the kickdown operation, then the engine E is started during EV mode in response to an engine starting command issued in conjunction with a kickdown performed by the driver, and the integrated controller 10 selects the maximum torque transfer capacity clutch as the second clutch CL2, and controls the torque transfer capacity of the second clutch CL2 based on slip engagement. Accordingly, when the engine E is started due to a kickdown procedure performed by the driver under the EV mode, it is possible to mitigate engine starting shock while ensuring clutch durability and optimal slip timing for the slip control.

When the hybrid vehicle drive control system is configured such that when there are no clutches in common between the two groups of clutches constituting the gear positions that are passed through before and after the engine has been started by a kickdown operation performed by the driver, then the maximum torque transfer capacity clutch detection section selects the clutch with the maximum torque transfer capacity as the second clutch CL2 in the respective gear positions that are passed through before and after the engine E is started, and the integrated controller 10 causes the second clutch CL2 having the maximum torque transfer capacity clutch to be changed when the engine starts and the gear position is shifted. Accordingly, a clutch whose capacity is controlled before and after a kickdown-induced act of shifting is caused to move in agreement with the engine starting timing, whereby smooth torque flow can be achieved even if the gear position has shifted.

When the hybrid vehicle drive control system is configured such that a completely engaged clutch has been selected as the second clutch CL2 when the engine E is started, then the integrated controller 10 will reduce the torque transfer capacity of the second clutch CL2 during engine starting. Accordingly, the torque transfer capacity of the second clutch CL2 will be reduced either when the engine E is started due to a decrease in battery SOC under the EV mode or when the engine E is started due to kickdown under the EV mode, thereby making it possible to mitigate engine starting shock accompanying fluctuations in engine output torque.

The hybrid vehicle drive control system for a hybrid vehicle of the present invention has been described with reference to the one preferred embodiment. However, the specific structure thereof shall not be limited to that of the illustrated embodiment; any modifications, amendments, or other alterations to the design thereof are permitted provided that no departure is made from the main points of the present invention pertaining to the claims.

In the illustrated embodiment, an example is given of a transmission with five forward gears and one reverse gear. However, the invention can also be used in an automatic transmission with four or even six or more forward gears. The engaged clutches in the transmission constitute the gear positions, and when any one of the engaged clutches can be used as the second clutch, and then the specific clutch in the transmission to be used as the second clutch to be controlled by slip engagement during engine starting will be indicated in the present invention.

The illustrated embodiment provides an example of the engine starting control section when engine starting is prompted by a decrease in battery SOC under the EV mode and by kickdown under the EV mode. However, the present invention can be used in circumstances where the engine E is started under the EV mode in response to alternate demands. The engine starting control section need not be limited to the description thereof in the first embodiment, provided that the engine starting control section selects, as the second clutch, the clutch having the maximum torque transfer capacity from among all engaged clutches in the automatic transmission that constitute the gear position when the engine E is started under the EV mode, and controls the torque transfer capacity of the second clutch based on slip engagement.

The illustrated embodiment describes an example of application for a rear-wheel drive hybrid vehicle; however, the present invention can equally be used in front-wheel and four-wheel drive hybrid vehicles. The present invention can be used in a hybrid vehicle provided that the vehicle has a hybrid drive system in which a first clutch is interposed between an engine and a motor/generator, a second clutch is interposed between the motor/generator and drive wheels, and one of a plurality of clutches accommodated within a transmission is used as the second clutch.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hybrid vehicle drive control system comprising:
   an engine;
   a motor/generator;
   a first clutch arranged between the engine and the motor/generator;
   a transmission including a plurality of gear position clutches arranged between the motor/generator and at least one drive wheel of a hybrid vehicle, with the gear position clutches being selectively engaged to obtain one of a plurality of vehicle running gears; and
   a controller configured to selectively start the engine by using torque transmitted from the first clutch during a mode change from an electric drive mode in which the first clutch is released to a hybrid drive mode in which the first clutch is engaged when an engine start command is issued while the hybrid vehicle is running in the electric drive mode with the motor/generator being used as a power source for driving the drive wheel of the hybrid vehicle,
   the controller being further configured to select a second clutch that is detected as having a maximum torque transfer capacity from among the gear position clutches that are engaged to constitute one of the vehicle running gears occurring during an engine starting process, and to execute a slip control of the second clutch when the first clutch is being connected to start the engine during the mode change from the electric drive mode to the hybrid drive mode.

2. The hybrid vehicle drive control system as set forth in claim 1, wherein
   the controller is further configured to select the second clutch to be slip controlled by detecting which of the gear position clutches that are engaged to constitute the vehicle running gear occurring immediately prior to starting the engine has the maximum torque transfer capacity, upon detecting a decrease in a state of charge of a battery while the vehicle is running in the electric drive mode.

3. The hybrid vehicle drive control system as set forth in claim 1, wherein
   the controller is further configured to select the second clutch to be slip controlled by detecting which of the gear position clutches that are engaged to constitute the vehicle running gears occurring from immediately before starting the engine until immediately after starting the engine have the maximum torque transfer capacity, upon detection of an accelerator pedal being depressed while the vehicle is running in the electric drive mode.

4. The hybrid vehicle drive control system as set forth in claim 3, wherein
   the controller is further configured to change which of the gear position clutches is designated as the second clutch to be slip controlled if none of the gear position clutches remain engaged in each of the vehicle running gears occurring from immediately before starting the engine until immediately after starting the engine, upon detection of the accelerator pedal being depressed while the vehicle is running in the electric drive mode such that the second clutch to be slip controlled for each of the vehicle running gears occurring from immediately before starting the engine until immediately after starting the engine has the maximum torque transfer capacity for that one of the vehicle running gears.

5. The hybrid vehicle drive control system as set forth in claim 1, wherein
the controller is further configured to reduce a torque transfer capacity of the second clutch to be slip controlled during the engine starting process when a completely engaged clutch from among the gear position clutches has been selected as the second clutch.

6. The hybrid vehicle drive control system as set forth in claim 2, wherein
the controller is further configured to select the second clutch to be slip controlled by detecting which of the gear position clutches that are engaged to constitute the vehicle running gears occurring from immediately before starting the engine until immediately after starting the engine have the maximum torque transfer capacity, upon detection of an accelerator pedal being depressed while the vehicle is running in the electric drive mode.

7. The hybrid vehicle drive control system as set forth in claim 6, wherein
the controller is further configured to change which of the gear position clutches is designated as the second clutch to be slip controlled if none of the gear position clutches remain engaged in each of the vehicle running gears occurring from immediately before starting the engine until immediately after starting the engine, upon detection of the accelerator pedal being depressed while the vehicle is running in the electric drive mode such that the second clutch to be slip controlled for each of the vehicle running gears occurring from immediately before starting the engine until immediately after starting the engine has the maximum torque transfer capacity for that one of the vehicle running gears.

8. The hybrid vehicle drive control system as set forth in claim 2, wherein
the controller is further configured to reduce a torque transfer capacity of the second clutch to be slip controlled during the engine starting process when a completely engaged clutch from among the gear position clutches has been selected as the second clutch.

9. The hybrid vehicle drive control system as set forth in claim 3, wherein
the controller is further configured to reduce a torque transfer capacity of the second clutch to be slip controlled during the engine starting process when a completely engaged clutch from among the gear position clutches has been selected as the second clutch.

10. The hybrid vehicle drive control system as set forth in claim 4, wherein
the controller is further configured to reduce a torque transfer capacity of the second clutch to be slip controlled during the engine starting process when a completely engaged clutch from among the gear position clutches has been selected as the second clutch.

11. A hybrid vehicle drive control system comprising:
first power supply means for supplying a first source of power in a hybrid drive mode;
second power supply means for supplying a second source of power at least in an electric drive mode;
first power transfer means for selectively changing a torque transfer capacity between the first and second power supply means;
vehicle running gear changing means for selectively changing a gear position among a plurality of vehicle running gear of a hybrid vehicle between the first and second power supply means and at least one drive wheel of a hybrid vehicle, the vehicle running gear changing means including a plurality of frictional engaging means for selectively attaining the vehicle running gears; and
control means for selectively starting the first power supply means by using torque transmitted from the first power transfer means during a mode change from the electric drive mode to a hybrid drive mode when a first power supply start command is issued while the hybrid vehicle is running in the electric drive mode with the second power supply being used as a power source for driving the drive wheel of the hybrid vehicle,
the control means further including functions of selecting one of the frictional engaging means that is detected as having a maximum torque transfer capacity from among the frictional engaging means that are engaged to constitute one of the vehicle running gears occurring during an engine starting process, and executing a slip control of the frictional engaging means that was detected as having the maximum torque transfer capacity when the first power transfer means is being connected to start the first power supply means during the mode change from the electric drive mode to the hybrid drive mode.

12. A hybrid vehicle drive control method comprising:
selectively operating a first clutch arranged between an engine and a motor/generator;
selectively operating gear position clutches of a transmission arranged between a motor/generator and at least one drive wheel of a hybrid vehicle, with the gear position clutches being selectively engaged to obtain one of a plurality of vehicle running gears;
selectively starting the engine by using torque transmitted from the first clutch during a mode change from an electric drive mode in which the first clutch is released to a hybrid drive mode in which the first clutch is engaged when an engine start command is issued while the hybrid vehicle is running in the electric drive mode with the motor/generator being used as a power source for driving the drive wheel of the hybrid vehicle;
selecting a second clutch that is detected as having a maximum torque transfer capacity from among the gear position clutches that are engaged to constitute one of the vehicle running gears occurring during an engine starting process; and
executing a slip control of the second clutch when the first clutch is being connected to start the engine during the mode change from the electric drive mode to the hybrid drive mode.

* * * * *